US008249550B2

United States Patent
Baggström et al.

(10) Patent No.: US 8,249,550 B2
(45) Date of Patent: Aug. 21, 2012

(54) METHOD AND APPARATUS FOR ACHIEVING GOOD USABILITY FOR NETWORKED APPLICATIONS IN MULTI MODE MOBILE TERMINALS

(75) Inventors: Stefan Baggström, Tampere (FI); Kari Heikkilä, Tampere (FI)

(73) Assignee: Nokia Corporation, Espoo (FI)

( * ) Notice: Subject to any disclaimer, the term of this patent is extended or adjusted under 35 U.S.C. 154(b) by 806 days.

(21) Appl. No.: 10/673,059

(22) Filed: Sep. 26, 2003

(65) Prior Publication Data

US 2005/0070290 A1 Mar. 31, 2005

(51) Int. Cl.
H04L 12/66 (2006.01)
(52) U.S. Cl. ........ 455/406; 455/408; 455/458; 370/235; 370/236; 370/352; 370/353; 370/355
(58) Field of Classification Search .................. 455/445, 455/410, 434, 62, 452, 454, 450, 512, 168.1, 455/436, 432.1, 404.1, 435.1, 435.2, 453, 455/552.1
See application file for complete search history.

(56) References Cited

U.S. PATENT DOCUMENTS

| | | | | |
|---|---|---|---|---|
| 5,655,003 | A * | 8/1997 | Erving et al. ................ | 379/418 |
| 5,752,193 | A * | 5/1998 | Scholefield et al. ....... | 455/452.2 |
| 6,141,565 | A * | 10/2000 | Feuerstein et al. ............ | 455/560 |
| 6,212,384 | B1 * | 4/2001 | Almgren et al. .............. | 455/446 |
| 6,430,396 | B1 * | 8/2002 | Bamburak et al. .............. | 455/62 |
| 6,795,857 | B1 * | 9/2004 | Leung et al. .................. | 709/224 |
| 6,829,481 | B2 * | 12/2004 | Souissi ......................... | 455/436 |
| 6,834,050 | B1 * | 12/2004 | Madour et al. ................ | 370/392 |
| 7,013,140 | B2 * | 3/2006 | Ostberg et al. ................ | 455/434 |
| 7,324,810 | B2 * | 1/2008 | Nave et al. .................. | 455/414.1 |
| 7,437,162 | B1 * | 10/2008 | Zhang et al. .................. | 455/445 |
| 2002/0168960 | A1 * | 11/2002 | Jacobson et al. .............. | 455/410 |
| 2003/0118015 | A1 * | 6/2003 | Gunnarsson et al. ......... | 370/389 |
| 2003/0139180 | A1 * | 7/2003 | McIntosh et al. ............. | 455/426 |
| 2004/0052231 | A1 * | 3/2004 | Ramaswamy et al. ........ | 370/338 |

(Continued)

FOREIGN PATENT DOCUMENTS

WO WO9930479 * 6/1999

(Continued)

OTHER PUBLICATIONS

*High Level and Process Patterns from the Memory Preservation Society*; Patterns for Managing Limited Memory; James Noble; Dec. 2003.

*Primary Examiner* — Patrick Edouard
*Assistant Examiner* — Julio Perez
(74) *Attorney, Agent, or Firm* — Harrington & Smith

(57) ABSTRACT

A method (and corresponding equipment) for use by a device (10) in establishing a network connection on behalf of an application (14a-d) hosted by the device (10), including: a step (23b) of obtaining information about currently active cellular network systems, which may include information about connections currently in use; and a step (24) of deciding whether to allow establishing the connection based on factors including the information about currently active cellular network systems. The information about connections currently in use may include identifiers for applications using the connections currently in use. The factors can also include the identity of the application making the request and the identities of the applications using connections currently in use, so as to make the decision as to whether or not to allow establishing the connection after taking into account the importance and type of the different applications contending for the network resources (connections).

22 Claims, 3 Drawing Sheets

U.S. PATENT DOCUMENTS

| | | | |
|---|---|---|---|
| 2004/0092265 A1* | 5/2004 | Chitrapu et al. | 455/436 |
| 2004/0121781 A1* | 6/2004 | Sammarco | 455/456.1 |
| 2004/0152482 A1* | 8/2004 | Raffel et al. | 455/522 |
| 2004/0156328 A1* | 8/2004 | Walton et al. | 370/313 |
| 2004/0203791 A1* | 10/2004 | Pan et al. | 455/442 |
| 2005/0107085 A1* | 5/2005 | Ozluturk | 455/439 |
| 2006/0195551 A1* | 8/2006 | Dowling | 709/217 |

FOREIGN PATENT DOCUMENTS

WO     WO 02/62084     1/2002

* cited by examiner

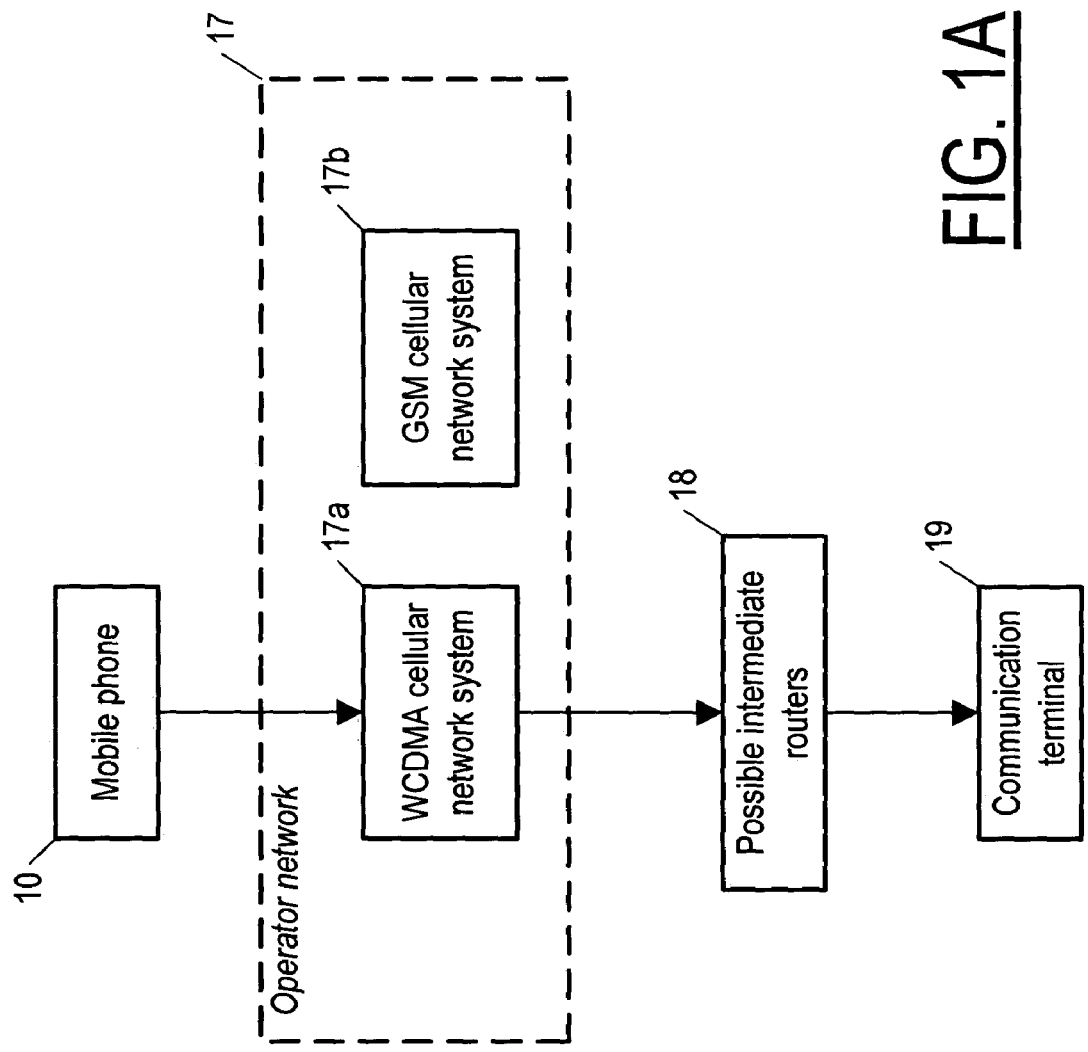

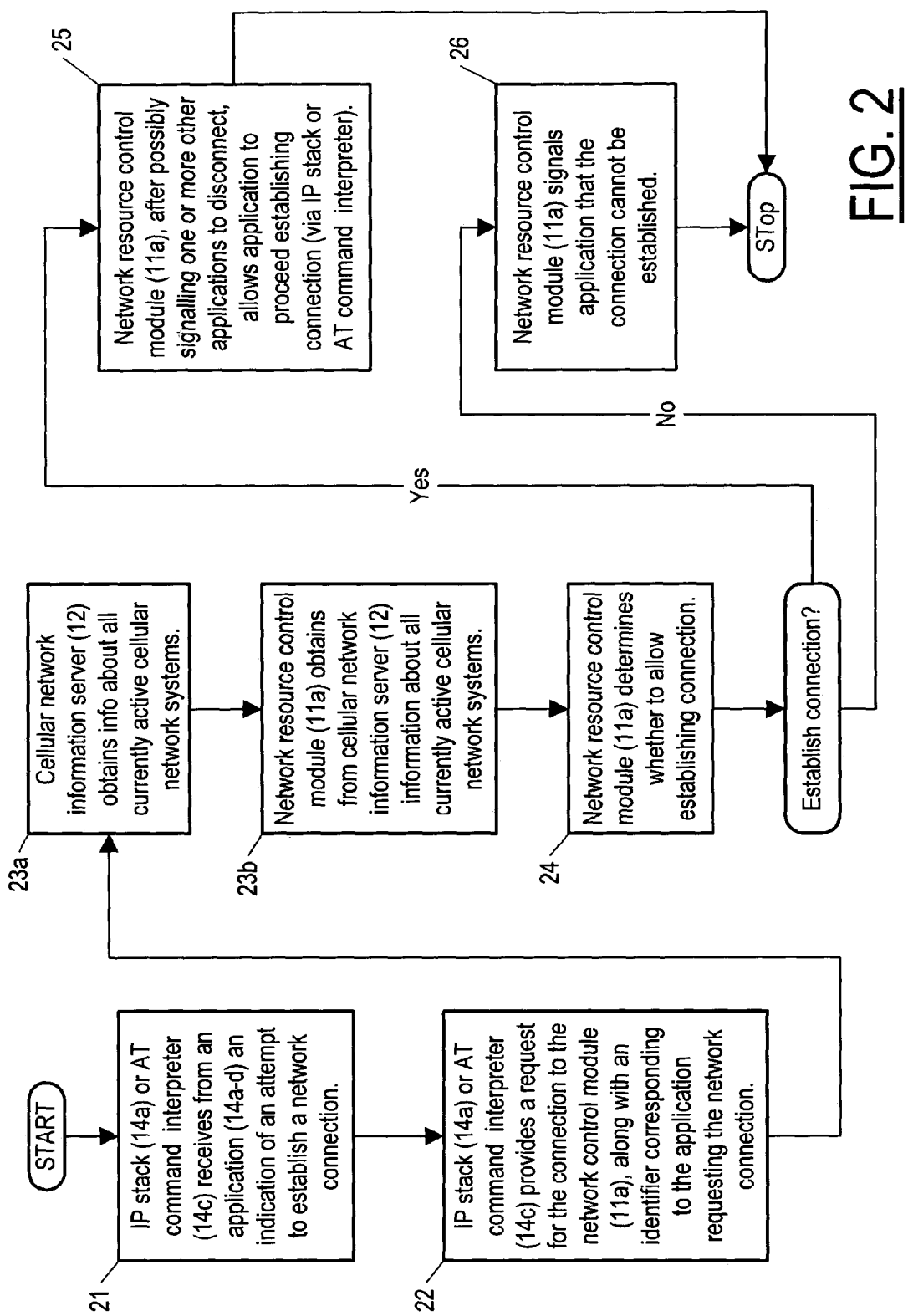

METHOD AND APPARATUS FOR ACHIEVING GOOD USABILITY FOR NETWORKED APPLICATIONS IN MULTI MODE MOBILE TERMINALS

TECHNICAL FIELD

The present invention pertains to the field of wireless telecommunication networks. More particularly, the present invention pertains to a communication terminal, such as a mobile terminal, establishing connections to such networks (i.e. through such networks to some other communication terminal including e.g. another mobile terminal or a server in a computer network).

BACKGROUND ART

Mobile terminals today typically have the capability to create a connection to a network; e.g. a mobile terminal (such as a mobile phone) can create a speech call, a circuit-switched data call or a packet data connection. A mobile terminal may support all or only some of these connections types. Even if all connection types are supported, the ability at any particular time to use the different connection types depends on the state of the mobile terminal at the time; i.e. the ability to use a certain connection type depends on the existence of the other possible connections. For example, a GSM (Global System for Mobile communication) GPRS (General Packet Radio Service) Class B phone cannot create a new packet data connection while a speech call is active.

Different cellular network systems support different combinations of concurrently active network connections. For example, a GSM network may provide different types of network connections than a WCDMA (Wideband Code Division Multiple Access) network, and so a mobile terminal when connected to a GSM network can have different types of concurrent network connections than when connected to a WCDMA network. Also, a mobile terminal may support intersystem handover functionality between different networks, and so a mobile terminal may use a GSM network at one time, and a WCDMA network (or a CDMA2000 network) at another time, and the available network resources may therefore change dynamically, i.e. even during a connection. The term network resource as used here indicates generally connections via an operator network, and also indicates any software or hardware associated with such connections.

In addition, a given cellular network system may support multiple concurrent packet-switched data connections. In case of a network according to 3GPP (Third Generation Partnership Program), the maximum number of network connections available to a mobile in communication via a cellular network system is limited by 3GPP specifications, by the mobile terminal, by the network vendor (by selecting which optional items from the specification to implement), and also by the operator (in selecting the network configuration). Multiple network connections are required to enable concurrent access to multiple networks (e.g. to access an intranet and to access the Internet), and also to support different levels of quality of service for different network connections. The support for multiple concurrent packet-switched data connections may also vary in different cellular network systems even within a single operator's (multi-cellular system) network; for example, there could be support for two connections in GSM, but only one in WCDMA.

Mobile terminals host a set of applications that use network connections. The types and number of applications vary by the mobile terminal vendor and by the mobile terminal model; for example, a mobile terminal can have traditional telephony applications (such as ability to create and receive speech calls), a WAP (wireless access protocol) browser, a MMS (multimedia message system) application and support for dial-up networking. All these applications share the same limited network resources.

A problem faced currently is that there are not enough resources to allow different applications to use a network connection simultaneously. Thus, e.g. a user of a mobile terminal must wait—sometimes for several minutes—while the mobile terminal is receiving an MMS message before the user is able to make a voice call.

The prior art teaches having the problem solved manually by the end user. Thus, a user first tries to use an application when another application is running, and if there are not enough resources, the operating system issues an error message to the user, and it is then up to the user to solve the problem. For example, if a user having a Nokia® 9210® communicator is accessing a network server in a first intranet and needs to access a network server in a second intranet, then the user may need to close the existing connection (to the first intranet) before connection creation to the other (second) intranet is possible.

What is needed, therefore, is a way to enable users of mobile terminals to concurrently use multiple applications hosted by the mobile terminals. Ideally, any method enabling concurrent use of different applications is transparent to the user, i.e. the user is not involved in resolving resource contentions and related problems that must be solved to allow the user to run an application when another application is already running.

DISCLOSURE OF THE INVENTION

Accordingly, in a first aspect of the invention, a method is provided for use in establishing a network connection on behalf of an application hosted by a device, the method comprising: a step of obtaining information about currently active cellular network systems; and a step of deciding whether to allow establishing the network connection based on factors including the information about currently active cellular network systems.

In accord with the first aspect of the invention, the information about currently active cellular network systems may include information about combinations of different kinds of connections allowed by each currently active cellular network system.

Also in accord with the first aspect of the invention, the factors may also include information about connections currently in use or the information about currently active cellular network systems may include information about connections currently in use. Further, the information about connections currently in use may include at least the number and type of connections currently in use. Further still, the method may also comprise: a step in which a request is made for permission to establish the network connection and the request includes an identifier corresponding to the application requesting the network connection; and, in addition, the information about connections currently in use may include identifiers for applications using the connections currently in use, and further in addition, the factors may also include the identifier for the application and the identifiers for applications using the connections currently in use.

Also in accord with the first aspect of the invention, the factors may also include the maximum amount of concurrent packet switched data allowed by the connections currently in use.

Sill also in accord with the first aspect of the invention, the active cellular network systems may include at least a GSM network, a WCDMA network, or a CDMA2000 network.

In a second aspect of the invention, a mobile terminal is provided including means so as to be operative according to the method provided according to the first aspect of the invention, and in particular therefore, so as to be equipped to establish a network connection on behalf of an application hosted by the mobile terminal, with the mobile terminal characterized in that it comprises means, responsive to a signal from the application to establish the connection, for providing a request to allow establishing the connection; and a network resource control module, responsive to a request to allow establishing the connection, and also responsive to information about currently active cellular systems, for determining whether to allow establishing the connection based on factors including the information about currently active cellular network systems. Also in particular and in accord with the second aspect of the invention, the factors may also include information about connections currently in use or the information about currently active cellular network systems may include information about connections currently in use, and the mobile terminal may be further characterized in that it also comprises: means for making a request for permission to establish the network connection with the request including an identifier corresponding to the application requesting the network connection; wherein the information about connections currently in use includes identifiers for applications using the connections currently in use, and further wherein the factors also include the identifier for the application and the identifiers for applications using the connections currently in use. Still also in particular, and in accord with the second aspect of the invention, the mobile terminal may be further characterized in that it also comprises a cellular network information server, responsive to a request to provide the information about currently active cellular systems, for providing such information.

In a third aspect of the invention, a computer program product is provided comprising: a computer readable storage structure embodying computer program code thereon for execution by a computer processor in a telecommunication terminal, with said computer program code characterized in that it includes instructions for performing the steps of a method provided according to the first aspect of the invention.

In a fourth aspect of the invention, a system is provided, comprising an operator network having at least one cellular system, and also comprising a mobile terminal according to the second aspect of the invention.

BRIEF DESCRIPTION OF THE DRAWINGS

The above and other objects, features and advantages of the invention will become apparent from a consideration of the subsequent detailed description presented in connection with accompanying drawings, in which:

FIG. 1A is a block diagram showing a mobile, of a type in which the present invention can be implemented, in communication with a communication terminal via an operator network, and in particular, via a WCDMA cellular network system of the operator network.

FIG. 2 is a flowchart of the method by which a mobile terminal establishes connections to a communication network, according to the invention.

BEST MODE FOR CARRYING OUT THE INVENTION

Figure 1B:
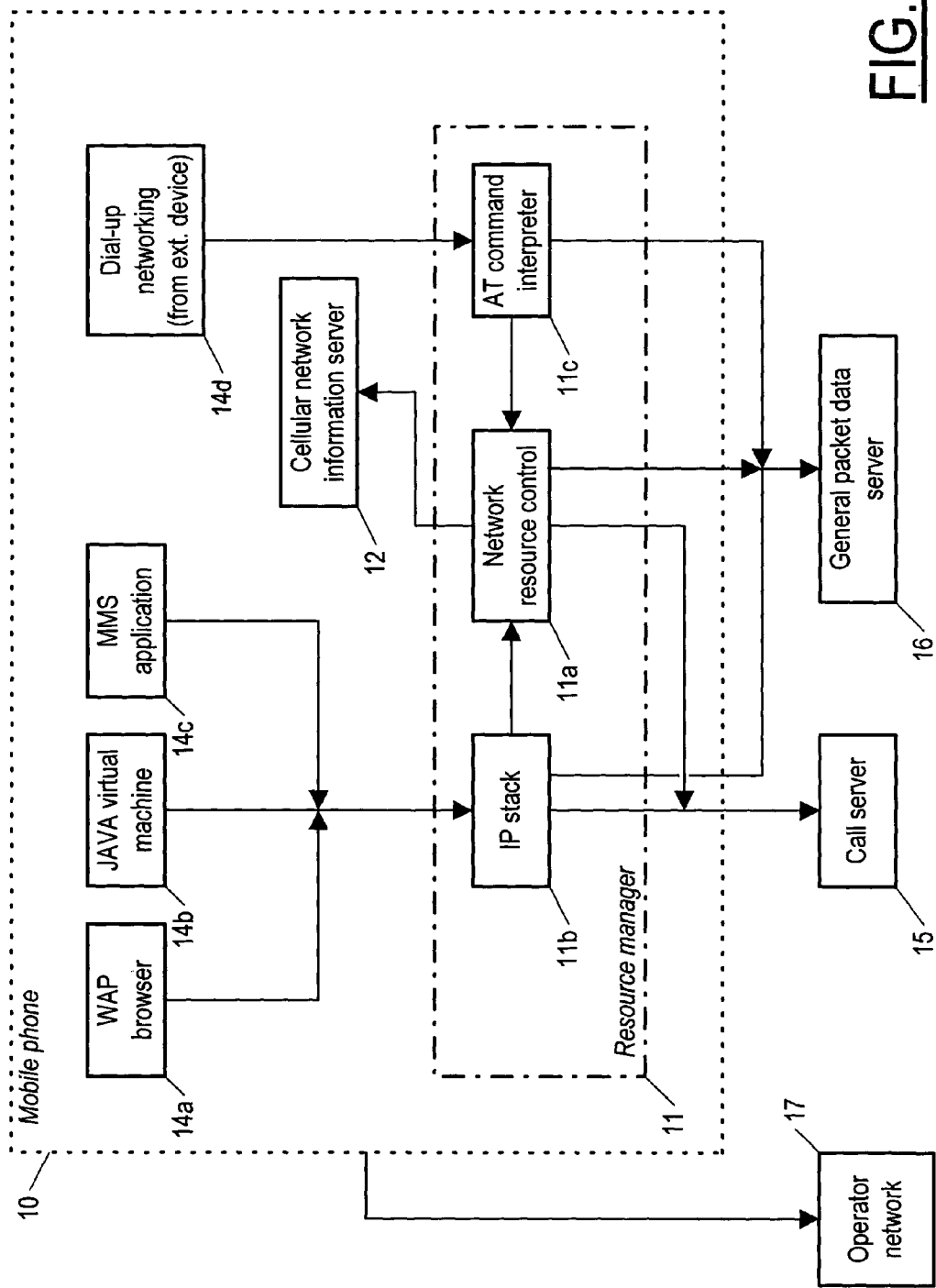
FIG. 1B is a block diagram showing components of a mobile according to the invention, and so having a network resource control entity controlling applications (such as a WAP browser or a MMS application) using the network resources—such as GPRS (General Packet Radio Service) and CSD (circuit-switched data) services—which are also shown, and including a cellular network information module for keeping track of the currently active cellular network system.

The invention is described here first by reference to FIGS. 1A and 1B, and in FIG. 1B an arrow terminating a line connecting one module to another indicates a "use" relation (between different software/firmware components), i.e. a relation in which the module pointed to provides services to the other module. (Thus, information is provided by the module pointed to, and so in the opposite direction as the arrows point in the figure.)

Referring now to FIG. 1A, a mobile terminal 10 (mobile terminal can be e.g. mobile phone, PDA, laptop with WLAN card etc.) adapted so as to operate according to the invention as described below is shown in communication with a communication terminal 19 via an operator network 17 including both a WCDMA cellular network system 17a and a GSM cellular network system 17b, and also via a possible intermediate routers 18 (including perhaps a plain old telephone system, or perhaps the Internet).

Referring now to FIG. 1B, the mobile terminal 10 is shown as including a network resource control module 11a of a resource manager 11. According to the invention, an application—such as a WAP (wireless access protocol) browser 14a, a JAVA virtual machine 14b, a MMS (multimedia subsystem) application 14c, or a dial-up networking application 14d—obtains permission from the network resource control module 11a to establish a network connection (i.e. to use a resource) before proceeding to actually establish the network connection, but the application is not itself in any way modified by the invention except possibly to provide an identifier for identifying itself in its request for permission to establish the connection, the identifier sufficient to enable the network resource control module 11a to determine the type of application making the request for permission to establish the connection and so providing a basis for the resource control module 11a to determine the importance of the application relative to any other applications already using resources. Besides adapting the applications 14a-d to possibly provide identifiers, the mobile terminal 10 is so adapted that when an application 14a-d attempts to establish a network connection, either an IP (internet protocol) stack 11b or (in case of dial-up networking) an AT command interpreter 11c (for so-called Hayes modem AT commands) requests permission from the network resource control module 11a on behalf of the application to establish the network connection. More specifically, when an application attempts to make a network connection, the IP stack or AT command interpreter obtains permission to use a specific bearer connection for providing the network connection, and the network connection is then either provided (by the network resource control module 11a), depending on predetermined factors and rules.

Still referring to FIG. 1B, in establishing a connection (i.e. to grant the use of a resource) the mobile terminal 10 uses a call server 15 to create and deactivate circuit switched data (CSD) calls, and uses a general packet data server 16 to create and deactivate packet switched data (PSD) connections. In addition, the network resource control 11a uses a cellular network information server 12 for obtaining information about the currently active cellular network system(s)—in particular, information such as whether an active cellular network system is a GSM or WCDMA network, what types of connections are allowed including what combinations of concurrent connections are allowed. In deciding whether to grant permission to establish the requested connection, the network resource control sometimes bases its decision on what connections are currently in use, information that either the network resource control 11a maintains for itself, or that the network resource control 11a obtains from the cellular network information server 12 as part of the information about the currently active cellular network system(s), or that is in part maintained by the network resource control 11a and in part provided as part of the information about the currently active cellular network system(s).

Also, the network resource control module 11a uses the call server 15 and the general packet radio server 16 to monitor the status of the resources, i.e. to monitor if there are active calls or packet-switched connections.

In some embodiments, the network resource control module 11a is implemented as a software component separate from the IP stack module 11b and AT command interpreter module 11c, although it is also possible to implement all three modules (i.e. the entire resource manager module 11) as a single software component.

As noted above, in obtaining permission (as described above) to use a network resource (i.e. to establish a network connection) before actually establishing a network connection, the invention provides in some embodiments that an application 14a-d identify itself to the network resource control module 11a. To this end, in some embodiments, applications are each assigned an identifier so that the network resource control module 11a can identify which application (and also what type of application) is using which resource/connection. The request, actually made to the network resource control module 11a by either the IP stack 11b or the AT command interpreter 11c, includes the application identifier because the IP stack 11b and AT command interpreter 11c are each adapted to obtain and provide the identifiers. The network resource control then makes a decision on allowing the use of the requested resource based on possibly several different factors: predefined or dynamic rules; the current use of the network resources, typically including e.g. how many connections are in use and the type of each connection in use, and also typically including the applications currently using the network resources already in use; and also the information about the currently active cellular network system(s) (which, as noted above, may or may not include information about the connections currently in use). Only if the network resource control module 11a grants permission does the application proceed to establish the network connection.

Further according to the invention, the mobile terminal 10 is so adapted that an application 14a-d releases an allocated network resource whenever the network resource control module 11a so commands, thus allowing the network resource control module 11a to interrupt any ongoing use of resources to allow higher-priority use of the resources. In addition, an application releases any resource as soon as the application is done using the resource (but need not notify the network control module 11a since the cellular network information server 12 can determine the resource is no longer in use), thus allowing the network resource control 11a to make the resource available for lower priority use.

In case of an inter-system handover, the network resource control module 11a may either interrupt use of a network connection by an application, or may allow the application to continue using the network connection, depending on rules that differ for different cellular network systems, since different cellular network systems in general support different combinations of different types of network connections, and also allow different maximum amounts of concurrent packet switched data.

Referring now to FIG. 2, the invention is shown as including a first step 21 in which either the IP stack 14a or the AT command interpreter 14c receives from an application 14a-d an indication of an attempt to establish a network connection, i.e. to use a network resource. In a next step 22, the IP stack 14a or the AT command interpreter 14c provides to the network control module 11a a request for the connection, along with an identifier corresponding to the application requesting the network connection. In a next step 23a, the cellular network information server 12 obtains info about all currently active cellular network systems. In a next step 23b, the network resource control module 11a obtains from the cellular network information server 12 information about all currently active cellular networks (if any), which, as noted above, may include all or some information about connections currently in use. In a next step 24, the network resource control module 11a determines whether to allow establishing connection based on the various factors mentioned above, i.e. based on predefined or dynamic rules, the current use of the network resources, and the information about the currently active cellular network systems.

If the decision is to allow establishing the connection, then in a next step 25, the network resource control module 11a, after possibly signalling one or more other applications to disconnect, allows the application to proceed establishing the requested connection (via the IP stack or the AT command interpreter). Otherwise, in a next step 26, the network resource control module 11a signals the application that the connection cannot be established.

It should be understood from the above description that the intelligent use of resources by a mobile terminal as provided by the invention is transparent to applications hosted by the mobile terminal; in particular, the applications do not need to know about each other, and so applications for a mobile terminal need be changed to support the invention only so as to have the applications identify themselves to the IP stack when opening new connections.

Note that the invention is clearly of use not only in case of operator networks including GSM networks and WCDMA networks, but also other networks, such as for example, CDMA2000 networks.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
   obtaining information about at least two currently active cellular network systems to each of which a communication device has one or more active connections for respective connected applications simultaneously hosted by the communication device, wherein the information includes at least a number and type of active connections currently in use; and
   deciding whether to allow establishing a new active connection to one of the at least two currently active cellular network systems on behalf of another application hosted by the communication device based on factors including the information about the at least two currently active cellular network systems, wherein an active connection comprises at least one of a speech call, a circuit-switched data call and a packet-switched data connection.

2. The method according to claim 1, wherein the information about the at least two currently active cellular network systems includes information about combinations of different kinds of active connections allowed by each currently active cellular network system.

3. The method according to claim 1, wherein the factors also include information about active connections currently in use or wherein the information about the at least two currently active cellular network systems includes information about active connections currently in use.

4. The method according to claim 1, further comprising:
the application making a request of the communication device to establish the network connection and including in the request an identifier for the application;
wherein the information about active connections currently in use includes identifiers for applications using the active connections currently in use, and further wherein the factors also include the identifier for the application and the identifiers for applications using the active connections currently in use.

5. The method according to claim 1, wherein the factors also include the maximum amount of concurrent packet switched data allowed by the active connections currently in use.

6. The method according to claim 1, wherein the active cellular network systems include at least a GSM network, a WCDMA network, or a CDMA2000 network.

7. A computer program product comprising: a non-transitory computer readable storage structure embodying computer program code thereon for execution by a computer processor in a telecommunication terminal, wherein said computer program code includes instructions for performing the method according to claim 6.

8. A computer program product comprising: a non-transitory computer readable storage structure embodying computer program code thereon for execution by a computer processor in a telecommunication terminal, wherein said computer program code includes instructions for performing the method according to claim 1.

9. An apparatus, comprising:
a resource manager, responsive to a signal from an application hosted by a mobile terminal and configured to establish an active connection to a cellular network system, and configured to provide a request to allow establishing the active connection, wherein the active connection comprises at least one of a speech call, a circuit-switched data call and a packet-switched data connection; and
a network resource control, responsive to the request to allow establishing the active connection, and also responsive to information about at least two currently active cellular network systems to each of which the mobile terminal has one or more active connections for respective connected applications simultaneously hosted by the apparatus, to determine whether to allow establishing the active connection based on factors including the information about the at least two currently active cellular network systems, wherein the information includes at least a number and type of active connections currently in use.

10. The apparatus according to claim 9, wherein the information about the at least two currently active cellular network systems includes information about combinations of different kinds of active connections allowed by each currently active cellular network system.

11. The apparatus according to claim 9, wherein the factors also include information about active connections currently in use or wherein the information about the at least two currently active cellular network systems includes information about active connections currently in use.

12. The apparatus according to claim 11, wherein the resource manager is configured to make the request for permission to establish the active connection, wherein the request includes an identifier corresponding to the application requesting the active connection;
and wherein the information about active connections currently in use includes identifiers for applications using the active connections currently in use, and further wherein the factors also include the identifier for the application and the identifiers for applications using the active connections currently in use.

13. A system, comprising an operator network having at least one cellular system, and also comprising a mobile terminal including an apparatus according to claim 12.

14. The apparatus according to claim 9, wherein the factors also include the maximum amount of concurrent packet switched data allowed by the active connections currently in use.

15. The apparatus according to claim 9, wherein the active cellular network systems include at least a GSM network, a WCDMA network, or a CDMA2000 network.

16. The apparatus according to claim 9, further comprising a cellular network information server, responsive to a request to provide the information about currently active cellular network systems, for providing such information.

17. A system, comprising an operator network having at least one cellular system, and also comprising a mobile terminal including an apparatus according to claim 9.

18. A mobile terminal, comprising:
an apparatus according to claim 9; and
means for wirelessly communicating with the at least two currently active cellular communication systems.

19. An apparatus comprising:
at least one processor, and
at least one non-transitory computer readable storage structure including computer program code, the at least one storage structure and the computer program code configured to, with the at least one processor, cause the apparatus at least to perform obtaining information about at least two currently active cellular network systems to each of which the apparatus has one or more active connections for respective connected applications simultaneously hosted by the apparatus, wherein the information includes at least a number and type of connections currently in use, wherein an active connection comprises at least one of a speech call, a circuit-switched data call and a packet-switched data connection; and
deciding whether to allow establishing a new active connection to one of the at least two currently active cellular network systems on behalf of another application hosted by the apparatus based on factors including the information about the at least two currently active cellular network systems.

20. The apparatus according to claim 19, wherein the information about the at least two currently active cellular network systems includes information about combinations of different kinds of active connections allowed by each currently active cellular network system.

21. An apparatus, comprising:
means, responsive to a signal from an application hosted by a mobile terminal to establish an active connection to a cellular network system, for providing a request to allow establishing the active packet-based connection, wherein the active connection comprises at least one of a speech call, a circuit-switched data call and a packet-switched data connection; and means, responsive to the request to allow establishing the active connection, and also responsive to information about at least two currently active cellular network systems to each of which the mobile terminal has one or more active connections for respective connected applications simultaneously hosted by the apparatus, for determining whether to allow establishing the active connection based on factors including the information about the at least two currently active cellular network systems, wherein the information includes at least a number and type of active connections currently in use.

22. The apparatus according to claim 21, wherein the factors also include information about the active connections currently in use or wherein the information about the at least two currently active cellular network systems includes information about the active connections currently in use, and wherein the means for providing the request to establish the active connection comprises:

means for making the request for permission to establish the active connection, wherein the request includes an identifier corresponding to the application requesting the active connection;

and wherein the information about the active connections currently in use includes identifiers for applications using the active connections currently in use, and further wherein the factors also include the identifier for the application and the identifiers for applications using the active connections currently in use.

* * * * *